United States Patent [19]

Hitchcock

[11] 4,256,054
[45] Mar. 17, 1981

[54] PET FEEDER

[76] Inventor: Kenneth H. Hitchcock, Rte. 1 Box 169H, Paso Robles, Calif. 93446

[21] Appl. No.: 83,291

[22] Filed: Oct. 10, 1979

[51] Int. Cl.³ .............................................. A01K 5/02
[52] U.S. Cl. ............................... 119/51.11; 119/51.5; 119/56 R
[58] Field of Search ............... 119/51.11, 51.13, 51.15, 119/56 R, 51.5, 52 R

[56] References Cited

U.S. PATENT DOCUMENTS

| | | | |
|---|---|---|---|
| 166,791 | 8/1875 | Long | 119/56 R |
| 534,082 | 2/1895 | Reeder | 119/56 R |
| 785,167 | 2/1903 | Steinberg | 119/56 R |
| 1,364,003 | 12/1920 | Smith | 119/56 R |
| 3,196,835 | 7/1965 | Bergevin | 119/51.11 |
| 3,504,654 | 4/1970 | Geerlings et al. | 119/56 R |
| 3,561,403 | 2/1971 | Wilson, Jr. et al. | 119/51.11 |
| 3,762,373 | 10/1973 | Grossman | 119/51.11 |
| 4,079,699 | 3/1978 | Longmore et al. | 119/51.11 |

Primary Examiner—Jay N. Eskovitz
Attorney, Agent, or Firm—Ralph B. Pastoriza

[57] ABSTRACT

The pet feeder comprises a cabinet structure having a sloping internal partition dividing the cabinet into an upper bin for receiving food and a lower chamber. A metering cylinder is secured under an opening in the partition for receiving food for a pet. This cylinder has a circumferential slot intermediate its upper and lower ends and cooperates with upper and lower paddles vertically spaced on a common shaft and circumferentially displaced so that the lower paddle covers the bottom of the cylinder when the upper paddle is to one side of the cylinder. Rotation of the mounting shaft for the paddles causes the upper paddle to enter the circumferential slot and the lower paddle to leave the bottom of the cylinder so that the amount of food between the circumferential slot and bottom of the cylinder is metered downwardly into the chamber. A food tray is provided for receiving the food and also a water tray with a float valve is provided with access openings to the exterior of the cabinet. A master timer periodically operates a solenoid to move the paddles and thus meter the food.

8 Claims, 7 Drawing Figures

PET FEEDER

This invention relates generally to pets and more particularly to automatic feeding apparatuses for feeding pets such as cats or dogs at pre-set time intervals.

BACKGROUND OF THE INVENTION

When families that own dogs take off a week-end or are away from home for an even longer period, they must either take the dog with them, kennel the dog or have a neighbor come over to feed the dog at appropriate time intervals. Kennels cannot always be relied upon to properly care for the dog nor can neighbors be totally relied upon. As a consequence, if the pet dog is very valuable the family will take the dog with them but such limits their activities to places where pets are accepted.

In the case of certain commercial operations, watch dogs are provided to guard a plant over a week-end. In order that the dogs be fed, it is usually necessary to hire someone to come in over the week-end and feed the dogs. This is an additional expense over and above normal company operations.

The foregoing problems have prompted the innovation of various types of pet feeding apparatuses which function automatically to feed a pet such as a dog at periodic intervals over extended periods of time. The problem with such automatic pet feeders as have been available heretofore is their relative complexity. Many such mechanisms utilize electric motors, storage water tanks, elaborate food metering arrangements, and so forth. Undoubtedly the reason that such automatic pet feeders have not come into wide use is this complicated structure which works against any type of continuous reliable operation. Moreover, such prior art structures as are available are relatively expensive.

BRIEF DESCRIPTION OF THE PRESENT INVENTION

With the foregoing considerations in mind, the present invention contemplates the provision of a greatly improved pet feeding apparatus which is completely automatic in that it will provide meals for a cat or dog at pre-set time intervals over an extended period of time. The invention thus eliminates the need to kennel a dog or have neighbors come in to feed the dog while the family is away. In the case of watchdogs for a commercial plant, the necessity of hiring someone to make special trips to the plant on the week-end to feed the dogs is avoided.

The design of the present invention results in one major advantage, to wit: simplicity in design and operation and utilization of a minimum number of parts. As a consequence, extreme reliability results.

Briefly, the pet feeder comprises a fairly large cabinet sufficiently heavy that it cannot be moved by the pet such as a dog or cat. The cabinet itself includes a top lid and a sloping partition dividing its interior into an upper bin and lower chamber. Dog or cat food of a granulated nature is placed in the upper bin by raising the lid.

The partition itself has an oblique opening formed in the lower portion of the partition beneath which there is provided a food metering cylinder. Feed placed on the partition in the upper bin will fall by gravity into this cylinder. A chopper means in turn is provided within the chamber portion in the form of upper and lower paddles mounted at spaced vertical points on a vertical shaft. The lower paddle normally covers the bottom of the cylinder to hold feed therein. The upper paddle is disposed in a circumferentially spaced relationship to the lower paddle to one side of the cylinder. The cylinder itself includes a circumferential slot intermediate its ends at the same level as this upper paddle. This slot extends for at least 180°.

A single powerful solenoid is provided to rotate the shaft and move the paddles from a first to a second position such that the lower paddle is swung away from under the cylinder and the upper paddle is swung into the circumferential slot so that food filling the cylinder has a measured amount chopped off by the upper paddle to fall through the lower open end into an appropriate food tray. When the solenoid is de-energized, powerful springs return the lower paddle to the underside of the cylinder to close the same off, the upper paddle being removed from the circumferential slot so that feed can again drop into the cylinder.

A timer is arranged to operate the solenoid for a given period of time at appropriately spaced time intervals depending upon the feeding intervals of the dog or cat.

By providing only a simple single solenoid in combination with the upper and lower paddles and metering cylinder a very simple mechanism is provided to effect automatic feeding of a pet at the desired time intervals.

BRIEF DESCRIPTION OF THE DRAWINGS

A better understanding of this invention as well as many further features and advantages thereof will be had by referring to the accompanying drawing in which.

DETAILED DESCRIPTION OF THE PREFERRED EMBODIMENT

Figure 1:
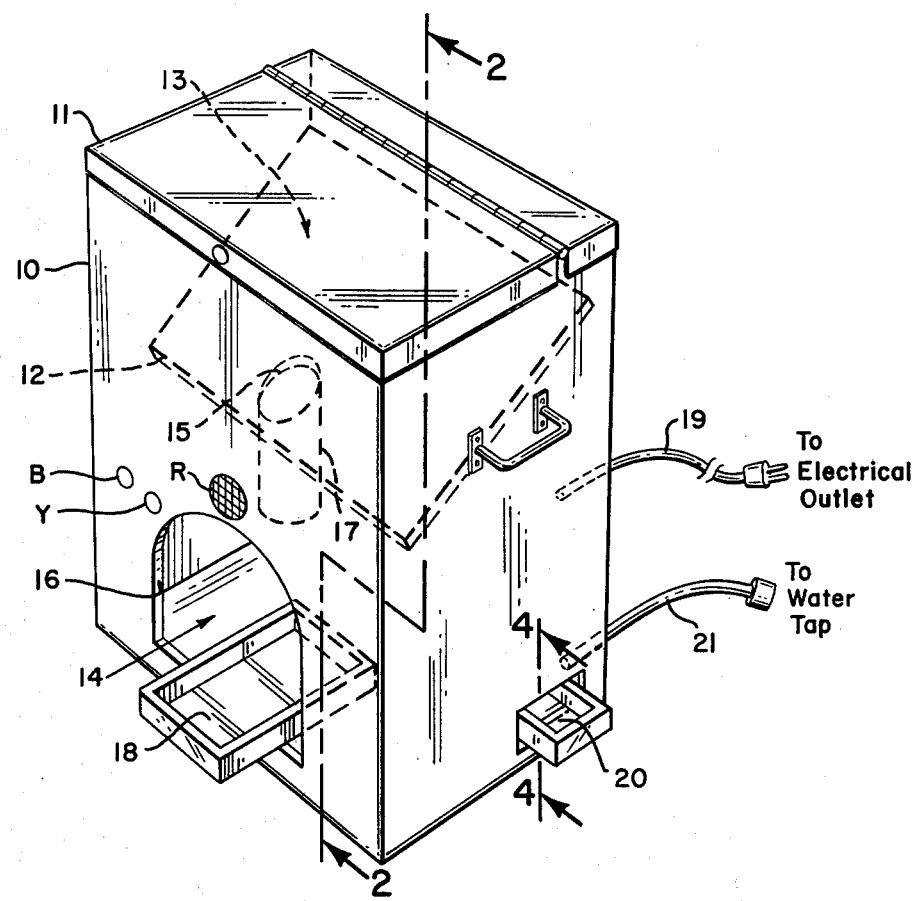
FIG. 1 is a perspective view of the pet feeder of this invention showing certain internal portions in phantom lines.

Referring first to FIG. 1, the pet feeder in accord with the present invention includes a cabinet 10 having a top lid 11 and a sloping partition indicated by the phantom lines 12 in the interior of the cabinet. Partition 12 divides the cabinet into an upper bin 13 and a lower chamber 14. The partition itself includes an oblique opening 15 in its lower central portion.

The lower front end of the chamber portion of the cabinet in turn includes a food tray receiving opening 16.

As will become clearer as the description proceeds, there is provided a food metering cylinder 17 secured beneath the oblique opening 15 to the partition 12. The arrangement is such that feed in the upper bin 13 provided by simply raising the lid 11 feeds into the cylinder 17 and is appropriately metered into a food tray 18 within the opening 16 as shown.

As will also become clearer as the description proceeds, the proper metering is effected by an appropriate timer and electrical components provided with electrical energy through an appropriate electrical line 19 extending from the rear of the cabinet.

In addition to food in the tray 18 for the pet in question, there is also provided a water supply in a water tray 20 shown extending from a lower side portion of the cabinet 10. This water tray is kept replenished with water through an appropriate hose line 21 arranged to be connected to an external water tap. By this arrangement, there is no necessity for storage tanks or the like and the water supplied is always fresh.

Still referring to FIG. 1, there are visible certain further features of this invention. Thus, as indicated by the letter B there is a blue pilot light which will be energized and advise a person that the system is plugged in and operating. Also there is provided a further pilot light in the form of a yellow light designated Y on the front of the cabinet which automatically becomes energized when the food supply in the bin 13 becomes too low.

Finally, there is provided a bell which will ring to alert a pet that it is time to eat. This signal is schematically designated R in FIG. 1 in the form of a small loudspeaker.

Figure 2:
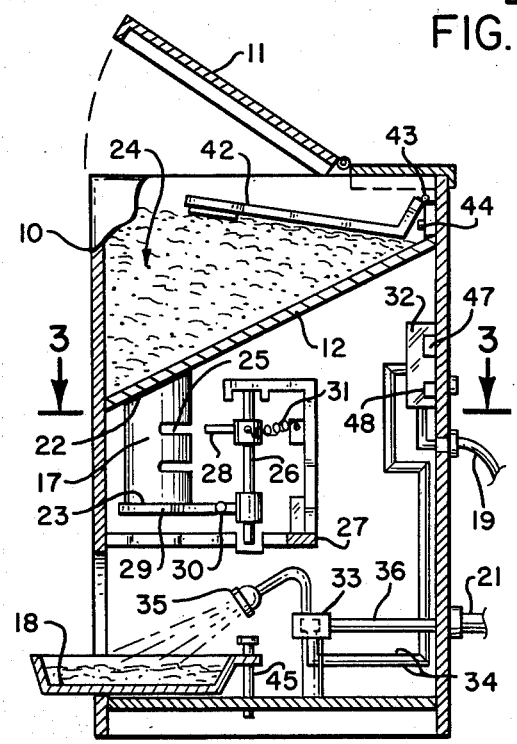
FIG. 2 is a cross section taken in the direction of the arrows 2—2 of FIG. 1.
Figure 3:
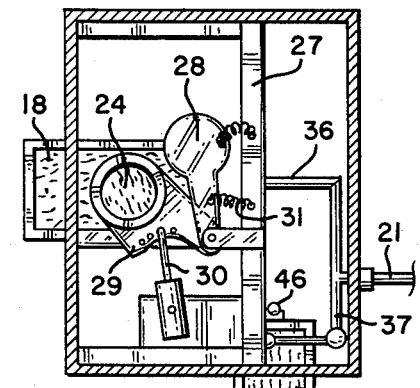
FIG. 3 is a top plan cross section taken in the direction of the arrows 3—3 of FIG. 2.

Referring now to FIGS. 2 and 3, further details of the pet feeder will become evident.

Referring first to the central left portion of the cross section of FIG. 2, it will be noted that the metering cylinder 17 has upper open end 22 cut on a bias so as to register with the oblique opening 15 in the partition 12 described in FIG. 1. The cylinder 17 itself is supported on the underside of the partition 12. The cylinder 17 has a lower open end 23 which is normally closed off as will be subsequently described.

In FIG. 2, appropriate dog food is shown at 24 above the partition 12, this dog food being received in the upper bin by raising the lid 11 as shown.

The manner in which the cylinder 17 and other components cooperate to meter a given amount of the food 24 into the food tray 18 will now be described. As shown in FIG. 2, the cylinder 17 is provided with a circumferential slot 25 intermediate its upper end 22 and lower end 23. A chopper means in turn is provided and includes a vertical shaft 26 mounted for rotation about a vertical axis to the interior of the cabinet chamber as by an appropriate frame 27.

Shaft 26 has secured to it at spaced vertical points upper and lower paddles 28 and 29. These paddles are circumferentially displaced such that when in a first position, the lower paddle 29 closes off the lower opening 23 of the cylinder 17 and the upper paddle 28 is to one side of the cylinder. A solenoid schematically depicted by the small circle 30 in FIG. 2 is mounted on the frame 27 and arranged to rotate the shaft 26 and paddles 28 and 29 simultaneously from a first to a second position. A biasing spring schematically indicated at 31 in FIG. 2, in turn, will return the paddles to their initial positions when the solenoid 30 is de-energized.

The foregoing operation will be described in greater detail subsequently. For the moment, and as will be evident from FIG. 3, it will be noted that the upper and lower paddles 28 and 29 are circumferentially offset so that the lower paddle 29 covers the bottom of the cylinder 17 when the paddle 28 is free from the circumferential slot 25. Essentially, when the solenoid 30 as shown in FIG. 3 is energized, it will pull the lower paddle 29 forwardly and simultaneously the upper paddle 28 will be received within the circumferential slot thereby chopping the column of food in the slot off to provide a metered amount which will fall by gravity from the bottom of the cylinder into the food tray 18.

As stated heretofore, when the solenoid 30 is de-energized, appropriate springs more clearly shown in FIG. 3 at 31 pull the paddles and shaft back to their first positions so that the paddle 29 once again covers the bottom of the cylinder and the cylinder itself is then filled with dog food by gravity from the bin.

Operation of the solenoid 30 is effected by means of an electrical timer shown in FIG. 2 on the rear wall of the cabinet at 32. Timer 32 is connected to the electrical line 19 described in FIG. 1.

Referring to the lower portion of FIG. 2, there is provided an electrically operated water valve 33 connected as by leads 34 to the timer 32 and arranged to be operated whenever the solenoid 30 is energized by the timer. A water spray head 35 connects to an appropriate hose 36 within which the valve 33 is positioned, this hose 36 in turn connecting to the water supply hose 21 extending from the rear of the cabinet. The arrangement is such that water will be sprayed from the spray head 35 onto food in the food tray 18 whenever the solenoid is energized by the timer. When the solenoid is de-energized to return the chopper paddles as described in FIG. 3 to their first positions, the supply of water to the spray head 35 is cut off by the electrically controlled water valve 33.

Referring once again to FIG. 3, it will be noted that the input water supply hose 21 is provided with a branch 37 extending towards the water tray 20 described in FIG. 1.

Figure 4:
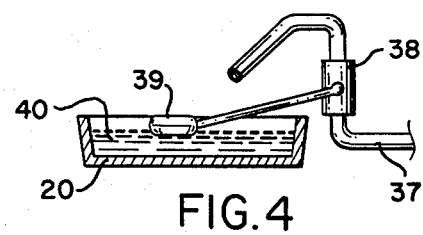
FIG. 4 is a fragmentary side elevational view of a portion of the structure looking in the direction of the arrows 4—4 of FIG. 1.

Referring specifically to FIG. 4, it will be noted that the water line 37 connects to a float valve 38 provided with a float 39 resting on water 40 in the water tray 20. When the level of the water 40 drops below a given amount, the float 39 will also drop downwardly and operate the valve 38 to replenish water to the tray, all in the conventional manner of a float valve. Water tray 20 is thus maintained filled with fresh water.

Figure 5:
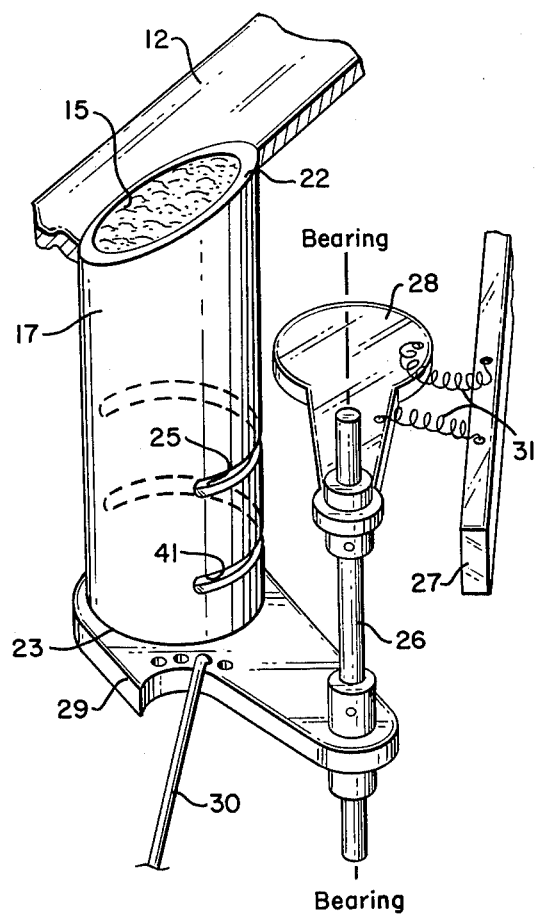
FIG. 5 is a highly schematic perspective view of major components making up the feed metering portion of this invention in a first position.
Figure 6:
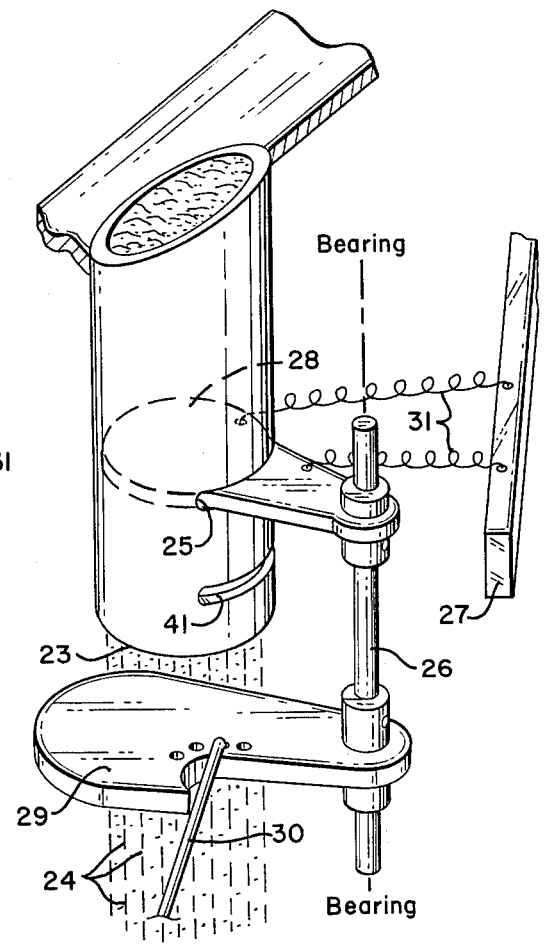
FIG. 6 is a view similar to FIG. 5 but illustrating the various components in a second operated position for metering food.

Referring now to FIGS. 5 and 6, the operation of the metering cylinder 17 will be better understood. In FIG. 5, the upper and lower paddles 28 and 29 are shown in their first positions secured to the shaft 26. The solenoid plunger 30 is shown connected to the lower paddle 29. It is to be understood that the paddles 28 and 29 and shaft 26 all rotate as a unit, the upper and lower ends of the shaft being held in appropriate bearings as indicated in FIG. 5 which bearings will be on the frame structure 27.

It will be appreciated that when the solenoid 30 is energized, it will pull the paddles and rotate the shaft 26 between the heretofore referred to first and second positions.

FIG. 6 illustrates the second position to which the paddles have been moved after the solenoid is energized. In this position, it will be noted that the lower paddle 29 is free from the bottom the cylinder while the upper paddle 28 has been moved into the circumferential slot 25 to prevent further feed from passing out the bottom.

Thus, a measured amount of feed as defined between the circumferential slot 25 and bottom 23 of the cylinder 17 will drop out of the bottom when the solenoid has moved the paddles to the second position shown in FIG. 6.

When the solenoid is de-energized, the springs 31 shown in FIG. 6 will return the paddles and shaft to the first position illustrated in FIG. 5.

In FIGS. 5 and 6, the thickness of the paddles as well as the width of the slot 25 has been greatly exaggerated for purposes of clarity. Actually, the paddles would be made of thin sheet steel so that there is no difficulty encountered in the paddle entering the slot and closing off the cylinder.

In FIGS. 5 and 6, it will be noted that the cylinder 17 is provided with an additional circumferential slot 41 below the slot 25 and bottom 23 of the cylinder. This additional slot may be provided for cooperation with the upper paddle 28, this upper paddle 28 having its securement point to the shaft 26 released and the paddle 28 vertically lowered to a position such that the paddle will be received in the slot 41 when the solenoid 30 is operated. By such an arrangement, the metered amount of food is decreased to a portion defined between the circumferential slot 41 and bottom of the cylinder.

As an alternative to the foregoing arrangement, it is possible to substitute in a different sized cylinder for cooperation with the choppers to change the amount of food metered.

It will be recalled in the description of the FIG. 1, that there was provided a yellow indicator light designated Y. This light is arranged to be energized when the amount of food in the upper bin 13 reaches a predetermined low level.

Referring specifically again to the upper portion of FIG. 2, the means for so indicating a low food condition in cooperation with the yellow light Y comprises an arm 42 pivoted at 43 to the central rear portion of the upper wall of the cabinet this arm extending forwardly to overlie food 24 placed in the bin. As the food is used up, the arm 42 falls by gravity downwardly as viewed in FIG. 2 until a point is reached such that a switch 44 is engaged by the arm 42 to thus energize the signal light Y of FIG. 1. Still another feature of this invention is illustrated in FIGS. 2 and 3 and takes the form of a simple bolt shown in the lower portion of FIG. 2 at 45 for holding the food tray 18 within the cabinet. This bolt can be removed to permit removal of the tray 18 for cleaning purposes. On the other hand, it constitutes an important feature in that it will hold the tray in the cabinet so that the dog or other animal cannot remove the tray.

A similar bolt structure is indicated schematically at 46 in FIG. 3 and serves to hold the water tray 20.

The assembly described is completed by the provision of an appropriate ON/OFF switch 47 for the timer 32 and an overriding push-button extra meal switch 48, both the switches being located on the timer 32 for easy access from the rear of the cabinet as illustrated in FIG. 2.

Figure 7:
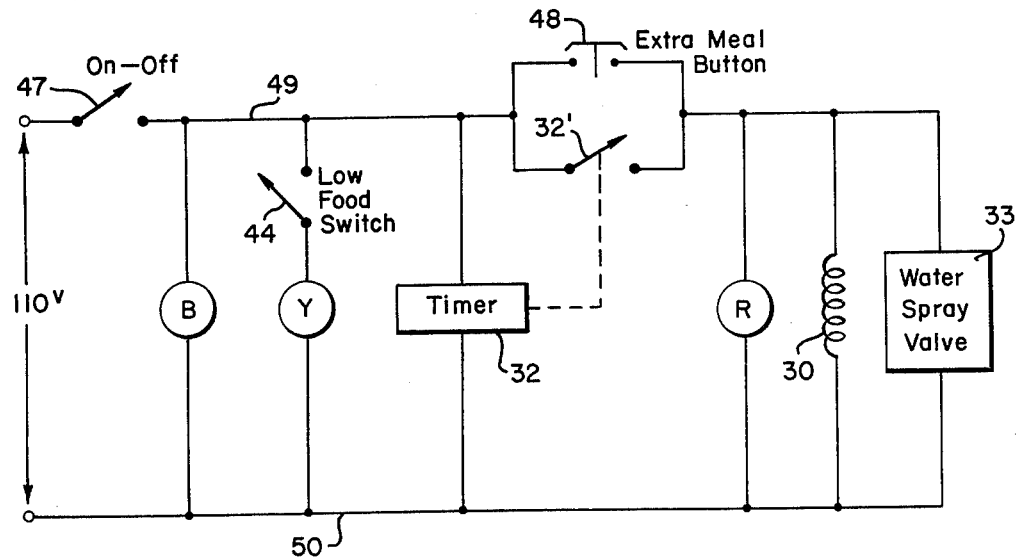
FIG. 7 is a ladder type electrical circuit diagram showing basic electrical connections in accord with the present invention.

The foregoing features as well as the overall operation of this invention will now become more apparent by reference to the circuit diagram of FIG. 7.

As shown, the power line from an appropriate electrical outlet on the cord 19 described in FIG. 1 connects to first and second power leads 49 and 50. The ON/OFF switch 47 described in FIG. 2 is shown in the power lead 49. It will be clear that when the ON/OFF switch is closed, power will be provided across the blue light B so that this light will be energized and advise a user that the apparatus is in operating condition. Further, the timer 32 will be energized since it is connected across the leads 49 and 50. Timer 32 is set to energize the solenoid for a given period of time at desired time intervals. For example, it can be set to operate the solenoid for a period of 10 seconds at 8:15 A.M. and at 6:00 P.M., thereby providing a morning and evening meal for a pet. Such timers are so well known in the art for closing and opening an electrical circuit at desired time intervals that further description thereof is unnecessary.

Thus, the timer 32 is simply shown by a block in FIG. 7 connected across the power leads 49 and 50 and mechanically connected to close a power switch 32' for the given period of time that the timer is to operate. For example, if such period of time is 10 seconds, the switch 32' will be closed for 10 seconds, thereby providing power from the leads 49 and 50 to the solenoid 30. The solenoid 30 will be energized and move the paddles from the position shown in FIG. 5 to the position shown in FIG. 6 and hold the paddles in this position for the period of 10 seconds. Thereafter, the timer will open the switch 32' and thereby de-energize the solenoid 30 so that the paddles will return to their initial positions by the springs 31.

Also it will be noted that the bell or ringing mechanism R is connected across the power leads 49 and 50 to the right of the timer switch 32' so that a bell will ring whenever the solenoid 30 is energized alerting the pet that food is ready.

Finally, the water spray valve 33 is shown connected across the lines 49 and 50 so that it will be energized whenever the timer switch 32' is closed and for the same period, for example, 10 seconds, as the solenoid is operated. Water will thus be sprayed on the feed to moisten the same, all as described heretofore.

When the feed becomes low, the arm 42 described in FIG. 2 will lower itself and eventually close the switch 44 which is shown in FIG. 7 connected in series with the yellow indicator light Y. Thus when switch 44 closes, the yellow light Y will be energized advising the user that the food supply is low. This indicator light only operates when the supply is low. Thus, there will always be some food left and the user will have adequate time to replenish the bin.

The float valve for the water tray has already been described so it will be clear that a fresh supply of water is always on hand for the pet.

The simplicity of the present invention actually resides in the metering cylinder and paddles together with the shaft and bearing structures described in FIGS. 5 and 6. Heavy duty bearings can be utilized and a powerful solenoid is the only essential electrical component together with a timer in the entire system. The solenoid can be made very powerful to assure a positive snapping action of the paddles from the position shown in FIG. 5 to the position shown in FIG. 6. The powerful spring 31 will always return the paddles after the solenoid is de-energized.

The entire cabinet can be made attractive, the overall size being similar to that of a washing machine or dryer. The structure is properly held to tight tolerances so that mice and other animals cannot enter the food storage compartment.

The timer itself can be set to feed the pet once per day or any number of times in between a 24-hour period.

A further final feature of this invention is in the form of the extra meal button 48 described in FIG. 2 and shown bridging the timer switch 32' in FIG. 7. At any time regardless of the setting of the timer, a person can simply press the extra meal button 48 and hold it for a few seconds, thereby energizing the solenoid 30 and water spray valve 33 to provide an extra meal. Releasing of the extra meal push button 48 then de-energizes the solenoid 30 and water spray valve 33 the same as though operated by the timer 32.

From all of the foregoing, it will thus be evident that the present invention has provided a greatly improved pet feeder which is simple and reliable in operation and exhibits various advantages over those heretofore available.

I claim:

1. A pet feeder including, in combination:
   (a) a cabinet having a top lid and a sloping partition dividing the interior of the cabinet into an upper bin and lower chamber, the lower central portion of said partition having an oblique opening, and the lower front wall of said cabinet having a food tray opening;
   (b) a vertical food metering cylinder having open upper and lower ends, the upper end being secured to the underside of said partition and cut at a bias to register with said oblique opening so that food placed in said bin by raising said lid fills said cylinder through its upper end opening, said cylinder having at least two vertically spaced circumferential slots intermediate its upper and lower ends each extending over at least 180°;
   (c) chopper means comprising a vertical shaft rotatably mounted in the interior portion of said chamber adjacent to said cylinder, and upper and lower circumferentially spaced paddles secured to said shaft at vertically spaced points such that the lower paddle covers said lower end opening of said cylinder and said upper paddle lies in the plane of one of said circumferential slots to one side of said cylinder, the circumferential spacing of said upper and lower paddles being such that when said shaft and paddles are rotated from a first to a second position, the lower paddle is swung out from under said cylinder and the upper paddle is swung into said one slot so that food filling said cylinder has a first measured amount chopped off by said upper paddle to fall through the lower end opening of said cylinder, said upper paddle preventing further food in said bin from falling through said cylinder, the securement point of said upper paddle to said shaft being releasable to enable vertical shifting thereof so that said upper paddle can be secured at a level to be received in the other of said two slots when moved from said first to said second position whereby a second different measured amount of food can be metered from said cylinder to fall through the lower end opening of said cylinder;
   (d) a food tray extending from the exterior of said cabinet partially within said food tray opening to underlie the lower end of said cylinder;
   (e) an electrically operable solenoid connected to move said shaft and paddles from said first to said second position when energized;
   (f) spring means for rotating said shaft and paddles together back to said first position from said second position when said solenoid is de-energized; and
   (g) timer means connected to said solenoid to energize said solenoid for a given period of time at desired set time intervals
   whereby a pet will have food available in said food tray for eating at said time intervals.

2. A pet feeder according to claim 1, including an electric bell mounted on said cabinet and connected to said timer for operation whenever said solenoid is energized to thereby alert a pet that food is available.

3. A pet feeder according to claim 1, including an electrically operated water valve in said cabinet connected to said timer for operation thereby when said solenoid is operated; and a water hose and spray head in said housing for connection to an exterior water supply tap, said valve being in said hose line and said spray head being directed into said food tray so that food when dropped into said tray is simultaneously moistened by water from said spray head.

4. A pet feeder according to claim 1, in which a side of said chamber portion of said cabinet has an opening; a water tray exposed through said opening; and a float controlled valve secured to said cabinet adjacent to said water tray connected to an external water supply tap, said float control valve maintaining a given level of water in said water tray.

5. A pet feeder according to claim 1, in which said cabinet has a blue light and a yellow light, said blue light being on when electrical energy is applied to said timer; and switch means responsive to the amount of food in said bin being reduced to a given level for energizing said yellow light, whereby a user is apprised when the food in said bin is low and should be replaced.

6. A pet feeder according to claim 5, in which said means responsive to the amount of food in said bin comprises an arm in said bin pivoted to the upper central rear portion of said bin and extending forwardly to overlie food in said bin resting on said partition, downward movement of said arm as food is used up closing a switch to energize said yellow light when said arm reaches a predetermined lower position.

7. A pet feeder according to claim 4, including means for securing said food tray and water tray in said cabinet so that they cannot be removed by a pet.

8. A pet feed according to claim 1, including a push-button switch connected to bridge said timer and energize said solenoid directly when manually depressed so that extra meals may be provided by operation of said push-button.

* * * * *